United States Patent Office 3,728,095
Patented Apr. 17, 1973

3,728,095
CHEMICALLY-STRENGTHENED GLASS-ENCAPSULATED GLASS ARTICLES AND PROCESS THEREFOR
Everett F. Grubb, Friedrich W. Hammer, and Joseph R. Monks, Toledo, Ohio, assignors to Owens-Illinois, Inc., Toledo, Ohio
No Drawing. Continuation of application Ser. No. 606,550, Jan. 3, 1967. This application Feb. 16, 1971, Ser. No. 115,876
Int. Cl. C03b 29/00; C03c 15/00
U.S. Cl. 65—30    11 Claims

ABSTRACT OF THE DISCLOSURE

Forming glass articles by encapsulating a main body of a base glass composition with a glass of a different, denser composition during the glass gob-forming stage, forming a glass article from the gob wherein the main body portion is of the base glass and has at least its outer surface covered by the encapsulating glass and heat treating the article to provide an alkali metal ion exchange between abutting glass surfaces so that the surface of the base glass body is under tension and the surface of the encapsulating glass is under compression. The outer surface of the article may subsequently be subjected to an ion-exchange treatment to further increase its compressive stress.

---

This is a continuation of our copending application, Ser. No. 606,550 filed Jan. 3, 1967, now abandoned, which is relied on herein.

This invention relates to glass articles having a main body of a glass of one composition and an outer layer of a glass composition that differs from that of the main body. The difference in the compositions is only partially attributable to differences in mole percent of two alkali metal oxides. The article has a surface layer with a higher maximum compressive stress value to provide greater strength and having a greater depth to provide reduced loss of strength due to abrasion during service use than that of an identical article composed entirely of the glass composition except for a change in the mole percent of alkali metal oxides of the glass composition of a surface layer obtainable by an ion-exchange treatment such as is capable of providing the article of the invention. The present invention also relates to a process of making the glass article of the invention.

In the process of this invention shaped glass articles are formed by at least partially encapsulating a main body of glass of one composition with a different glass and then subjecting the encapsulated article to an ion-exchange treatment to substitute alkali metal ions for a different alkali metal ion in at least an outer portion of the encapsulating glass.

In the preferred embodiment of the process of the invention the encapsulated article is changed in shape to form a glass container, such as a bottle, before the ion-exchange treatment. In that case the encapsulated article is a glass gob. Conventional automatic machinery for forming such containers from gobs of glass is used in the shaping operation. In the present process, the encapsulated gob of glass has a central or main body of one glass composition and an encapsulating glass of a different composition. The main body of glass is encapsulated to an extent such that the gob is converted by conventional forming operation to a container that has at least its main outer portions composed of this encapsulating glass. The formed container is subjected to an ion-exchange treatment in which at least the outer surface layer of the encapsulating glass is contacted with an ion-exchange medium under conditions of temperature and time to provide a predetermined degree of ion-exchange to effectuate a compressive stress surface layer so as to improve the flexural strength in such treated portions of the container. The depth of the ion exchange is at least such that the container is protected from breakage damage in normal service use by this compressive stress surface layer.

This at least partially encapsulated glass gob is obtained by making in a furnace a glass of the composition of the main body of the gob, flowing the glass from the furnace through the channel of a forehearth to a gob feeder from which it flows downwardly through an orifice where periodic increase in flow being afforded by means of a vertically reciprocating plunger within a tube extending down into the glass and above the orifice and shearing a gob of glass from the glass below the orifice through which the glass is flowing. To this extent the preferred embodiment is that of the present commercial process of making gobs of glass that are fed to conventional automatic forming equipment for the manufacture of containers, such as by press-and-blow operation or a blow-and-blow operation. This conventional gob formation from a glass furnace by the utilization of a forehearth and a gob feeder is the present manufacture of glass containers using soda-lime-silica glass.

The present process in this preferred embodiment differs from the conventional gob manufacture by the introduction of glass of a different composition to the bottom portion of the channel of the forehearth so that the glass of this different composition flows concomitantly with the flow of the glass from the furnace, hereinafter referred to as base glass, illustratively soda-lime-silica glass, that is above it within the forehearth channel. These two layers of different glasses flow into the gob feeder zone and then out the orifice. The bottom glass flows along the base of the feeder and out the orifice as an outer annular flow in contact with the base of the feeder defining the orifice. The base glass as an upper layer in the feeder zone flows to the orifice and then through the orifice in the cylindrical area defined by and within the annular area through which the other glass that is flowing through the orifice. The rate of flow of these two glasses through the orifice is a flow of base glass encapsulated by the other glass. The flow of glass is increased by the downward movement of the plunger. Glass below the orifice is sheared at a conventional predetermined time to produce a gob in which the base glass constitutes the main body of the gob and the glass of the different composition introduced at the forehearth is the encapsulating glass of the gob. The shearing cycle and the plunger movement cycle are coordinated in the well known manner, e.g., as described in section X, Feeding and Forming, on pp. 303–387 (illustratively on p. 320), of "Handbook of Glass Manufacture," compiled and edited by Fay V. Tooley and published in 1953 by Ogden Publishing Co., New York, N.Y.

The addition of glass frit at the forehearth to glass flowing through the forehearth from the glass furnace is old. Such process is described in numerous patents including U.S. Pats. Nos. 2,817,191 and 3,057,175. The purpose of such addition of glass frit at the forehearth is to incorporate colorant into the base glass from the furnace without affecting the color of the base glass in the furnace. This permits the flow of the base glass to other forehearths from which it can flow to the associated gob feeders without any change in color. In one or more of these other forehearths the base glass can be changed to other colors by the addition of different colorant frits.

In such manufacture using colorant frit addition to the base glass at the forehearth, the objective is the intimate mixing and thus homogenization of the base glass and the colorant frit so that the containers made from gobs of this new glass will have glass of uniform composition and color. The two U.S. patents, mentioned above, show various mixing equipment disposed within the channel of the forehearth downstream of the forehearth addition to effectuate the necessary intimate and vigorous mixing for complete dissolution of the colorant frit in the base glass. The second-mentioned patent includes a modified forehearth structure, downstream of the frit addition to provide a longer residence time within the forehearth of a specific overall length. This modification is a recess in the bottom of the channel. A skimmer block is disposed above the recess and in the path of normal travel of the glass so as to force the flowing glass to move downwardly into the recess, thereby increasing the length of travel. Stirrers are disposed on opposite sides of the skimmer block and above the recess. These mixers are positioned approximately at the places where the glass moves downwardly into the recess upstream of the skimmer block and moves upwardly from the recess downstream of the skimmer block. This illustrates the necessity for thorough mixing of the frit with the glass from the furnace to provide a uniform glass to be fed into the gob feeder.

The process of the present invention in this preferred embodiment, that uses gob feeding and forehearth flow, differs from the foregoing prior art process that includes addition of colorant frit to the glass flowing through the forehearth. In the present process the different glass is added under conditions to avoid incorporation in the base glass and the flow of both glasses through the channel of the forehearth is such that the mixing of the glass added at the forehearth and the glass from the furnace is minimized. Thus there is obtained and there remains a stratification of glass in the channel as two layers of glasses that flow to the gob feeder zone. The upper layer or stratum is glass from the furnace and a lower stratum is glass added at the forehearth, of course, at a place spaced from the juncture of the forehearth and the furnace. The glass added at the forehearth is not only of a different composition than the base glass; it is more amendable to ion exchange of alkali metal ions for different alkali metal ions in the glass to create a compressive stress surface layer.

To provide such flow of two strata of the different glasses from the downstream end of the forehearth and thus into the gob feeder zone, it is requisite that the glass added at the forehearth, whether in particulate form or as a liquid, the latter being preferred, has at the temperatures within the forehearth downstream from the place of addition and within the gob feeder zone, a greater density than that of the base glass above it. In accordance with this invention the added glass also has a molten form and a higher surface tension than that of the base glass.

In a preferred aspect of this embodiment of the process of the invention, the glass that is added at the forehearth to become the encapsulating glass, has a lower coefficient of linear thermal expansion than that of the base glass, i.e., the glass from the furnace, especially when the ion-exchange treatment of the article substitutes alkali metal ions having a larger ionic radius than the alkali metal ions replaced in the glass by this treatment. When the ion exchange substitutes the larger alkali metal ions, the temperature is sufficiently low, such as below the strain point of the glass, that most, if not all, of the compressive stress created in a surface layer by the ion exchange is not relieved.

In that case, the temperature of the formed article during the ion-exchange treatment does not result in a loss of much, if any, of the compressive stress initially created when the article is cooled after its formation from the glass gob. That compressive stress is due to this difference in expansion coefficients of the two glasses.

Even though it is preferred that the encapsulating glass have a lower expansion coefficient than that of the base glass for the reason indicated above, the encapsulating glass can have a higher expansion coefficient than that of the base glass. However, the difference between the two expansion coefficients in such case is quite limited, unless the process of manufacture of the shaped article before or during the ion-exchange treatment utilizes a sufficiently high temperature for a sufficient period of time to provide interdiffusion of alkali metal ions between the two glasses in their adjacent portions so as to provide a graduated change of expansion coefficient in the general area of their interface. This interdiffusion can provide such result if the encapsulating glass contains lithium ions to a greater extent than the base glass so that lithium ions will diffuse from the encapsulating glass to the adjacent portion of the base glass and sodium ions will diffuse from the base glass to the encapsulating glass so as to reduce the difference in expansion coefficient of the two glasses in these interfacial portions of the glasses.

In the preferred embodiment the encapsulating glass has a composition that includes a much higher $Al_2O_3$ content than that of the base glass. Preferably the base glass has a very low alumina content, i.e., less than 5% by weight of $Al_2O_3$ and contains a sufficient concentration of CaO that has at such concentration an inhibiting effect on the rate of ion exchange. Conventional soda-lime-silica glass composition used in the manufacture of glass containers comprises on a weight basis about 70% to 75% $SiO_2$, 0.1% to 3% $R_2O_3$, 6% to 12% CaO, 0% to 6% MgO, 0% to 1% BaO, 10% to 20% $Na_2O$, 0% to 1% $K_2O$ and 0% to 5% $B_2O_3$. The $R_2O_3$ represents metal oxides such as $Al_2O_3$. The alumina constitutes almost the entire content of $R_2O_3$. These ranges of ingredients expressed as oxides are presented in U.S. Reissue Pat. No. 25,456. That patent indicates further that some production of containers from glass using as one of the batch ingredients a sand that has a high $Al_2O_3$ content so that the glass may contain as much as 9.5% by weight of $Al_2O_3$. Such glass composition is exemplified by glass No. 7 of Table III of the patent. That glass contains more than 8% by weight of CaO. Such is the case for the glasses that contain less than 3% by weight of $Al_2O_3$, as exemplified by the low alumina-containing soda-lime-silica glasses presented in Table IV of that patent.

Accordingly, it is seen that the preferred embodiment of the present process preferably uses soda-lime-silica glass of low $Al_2O_3$ content as the base glass and uses as the encapsulating glass a composition containing a high $Al_2O_3$ content, i.e., greater than 10% by weight than $Al_2O_3$, as exemplified later by a type of glass that contains about 14% to 25% by weight of $Al_2O_3$. Some of the glasses of the latter type that are used as encapsulating glass contain more than 10% by weight of CaO and as high as about 30% by weight of CaO. Some contain more than 10% and as much as about 20% by weight of MgO. In any event, all of such glasses of that type contain CaO and/or MgO such that the total, expressing MgO as CaO mole equivalent, is between 10% and 30% by weight of the glass composition.

In the process of colorant frit addition to base glass in a forehearth it is undesirable to use a glass for the frit a composition that contains more than a very small amount of $Al_2O_3$. As described in U.S. Pat. No. 3,024,121 it is advantageous for easy mixing of frit and base glass to provide a homogeneous glass, that the colorant frit use a glass composition that is free of $Al_2O_3$. In column 6 of that patent at lines 20 through 55, there is described the undesirable increase of the surface tension of the frit glass by the presence of alumina. The presence of 9% by weight of $Al_2O_3$ provides almost a 10% increase in surface tension. Column 5, at lines 64–75, of that patent describes the desirability of keeping low alumina and magnesia contents in the frit glass. A frit with a lower surface tension can be mixed more readily with the base glass. The first paragraph of column 6 describes the desirability of restricting CaO content to not more than 5% by weight of the frit composition. However, in the present process mixing of the encapsulating glass and base glass to any appreciable extent is not desired and actually is to be avoided. Thus the preferred glass compositions utilized in the preferred embodiment of the present process as encapsulating glass are different in these respects to those utilized in colorant frit forehearth, addition process.

Other colorant frit compositions are disclosed in U.S. Pats. Nos. 2,923,635 and 2,923,636. Those frits contain less than 2% by weight of $Al_2O_3$ and a large number of compositions are indicated as containing less than 1% by weight of $Al_2O_3$. U.S. Pat. No. 2,916,387 describes frits for forehearth addition that contain 2% to 12% by weight of $Al_2O_3$, but it may be noted that such frits are not silica glasses. Instead they contain 55% to 72% by weight of $P_2O_5$.

Because this preferred process adds an encapsulating glass to the forehearth so as to form two strata of glasses that are fed to the gob feeder zone, an avoidance of mixing of the encapsulating glass with the base glass to any great extent is required. To minimize the opportunity of such intermixing, the addition of encapsulating glass preferably should be to the channel of the forehearth as near to the gob feeder zone as is practical. Of course, when the encapsulating glass is added in pulverulent form from above the base glass flowing through the forehearth, the location of such addition to the forehearth should be far enough upstream of the gob feeder zone to permit the settling of the added pulverulent encapsulating glass to the bottom of the channel and then the melting of that glass with subsequent layer formation and flow of molten glass as a bottom stratum to the gob feeder zone. The same is true generally with regard to the addition of molten encapsulating glass.

However, the distance between the place of addition and the gob feeder zone may be shortened if the added molten encapsulating glass is introduced through a series of spaced vertical pipes extending down through the base glass with their bottom open ends spaced from the floor but close to it. The pipes are spaced from each other to avoid the creation of turbulent flow of the base glass. Furthermore, the pipes can be joined at the bottom to a transversely-extending pipe adjacent to the bottom of the channel and having a long slit in its wall facing the downstream end of the forehearth.

Other equipment can be utilized to introduce the molten encapsulating glass to the bottom portion of the channel in a manner to minimize intermixing of the two glasses. For example, the bottom of the channel can be constructed as disclosed in U.S. Pat. No. 2,817,191 with a transversely-extending recess in the bottom of the channel such as shown in U.S. Pat. No. 3,057,175. The encapsulating glass is fed from the side to this lower portion of or recess in the channel. A source of molten encapsulating glass in a chamber can communicate by a channel with that recess of the forehearth channel. The adjustment of the head of glass in the chamber can determine the top surface of the encapsulating glass in the forehearth channel. Of course, in such construction the dam on the floor just downstream of the recess in the forehearth construction shown in the latter patent would not be present because it would create turbulence, that would result in undesirable intermixing of the two strata of glasses. Preferably the recess would be placed further downstream than shown in U.S. Pat. No. 3,057,175.

The downstream end portion of the floor of the forehearth channel preferably would be upwardly inclined toward the gob feeder zone so as to permit a greater depth of encapsulating glass upstream of this inclined portion of the floor while providing a decreased depth of encapsulating glass flowing into the gob feeder zone.

Various modifications of the top surface of the orifice can be made to insure that the heavier glass will flow with the base glass through the orifice so as to completely encapsulate the base glass flowing out the orifice. This is preferred. This does not occur with certain designs of the spout or orifice of the gob feeder. In such cases, the floor of the feeder may require a construction to be tilting downwardly away from the forehearth to insure that the flow of the encapsulating or heavier glass is completely around the orifice. Other modifications are apparent to insure that both glasses flow out the spout. For example, the floor of the forehearth adjacent to the feeder can be provided with longitudinal grooves of increasing depth in the downstream direction. The floor of the feeder can be provided with concentric grooves having bases at different lowering elevations, with the innermost concentric groove being at the lowest elevation. The latter floor also has radial grooves. The concentric grooves are also concentric with the orifice. The innermost groove connects by radial grooves to the portion of the floor, that is the lowermost portion of the floor, immediately around the orifice.

The control of the ratio of heavier glass to base glass through the orifice can be accomplished by supporting a cylindrical weir concentric with the orifice and spaced above the floor of the feeder in an adjustable manner. The top end of this weir is such as to avoid interference with the function of the normal revolving tube in the feeder. The bottom portion of this weir can be inwardly flared to conform in general with the surface of the floor of the feeder at and adjacent the orifice can be made with a greater radius of curvature than used heretofore. The heavier glass would flow between this weir and the floor to the orifice while the base glass would flow down through the concentric tube or weir. This weir can be supported from above by a number of rods so as to minimize hindrance to the flow of base glass flowing above the weir and then through it to the orifice.

In this process it is desirable to minimize the depth of the encapsulating glass of the formed article to the extent consistent with the depth of ion exchange to be obtained for increased strength and resistance to loss of strength by abrasion. The depth of encapsulating glass of the formed article is determined by the depth of the lower of the two strata of glasses flowing into the orifice of the gob feeder. The diameter of the gob obtained by the flow of these two glasses through the orifice is determined by the orifice diameter. This is described on p. 318 of Tooley's "Handbook of Glass Manufacture," mentioned above. The relationship, for a bottle forming operation, between the orifice diameter and the weight of the gob is described on pp. 318 and 319.

Different gob sizes and thus weights are used for the making of different sizes of blown glassware. E. B. Shand in his book "Glass Engineering Handbook," 2nd edition, published in 1958 by McGraw-Hill Book Company, Inc., New York, N.Y., at p. 189 tabulates normal median wall thicknesses for light-wall and heavy-wall containers made by the press-and-blow operation using automatic forming machinery. The values range between 0.06 inch and 0.18 inch. It has been calculated that for a container made using a 1-inch orifice that the radius of the gob is 8 times that of the wall thickness of the formed container. Thus with encapsulating glass being about $\frac{1}{10}$ of the radius of the gob, it has been calculated that the thickness of the encapsulating glass in a formed container, having a wall about 0.06 inch thick, is about 150 microns. Ion exchange to a depth of at least about 10 microns is sufficient to retain a substantial degree of increase of strength afforded by the ion exchange, during the use and reuse of certain products, such as containers, for a reasonable period of time. Thus such 10% relationship of the layer depth of encapsulating glass for the gob is considered to be much greater than required for a subsequent ion-exchange treatment to provide an increase of strength of containers for advantageous normal use. Thus the present process contemplates flowing through the orifice glass-encapsulated glass in which the encapsulating glass constitutes about 1% to about 50% of the radius and thus the radius of the resultant encapsulated gobs of glass obtained by the shearing operation.

It is not necessary that the ends of the gobs have the encapsulating glass overlying the base glass. As described on p. 318 of Tooley's book mentioned above, the shape of the gob is determined in part by the length and acceleration of the stroke of the plunger. The desired gob shape is predetermined by the forming operation to convert the gob to a shaped article. Such gob shapes are shown on p. 320 of that book.

It is apparent from pp. 322 and 328 of the book that in blow-and-blow forming processes the interior surface of hollow containers, such as bottles, may be entirely the base glass even if the base glass at the ends of each gob are covered by encapsulating glass. It is more likely that using a press-and-blow process, such as shown on p. 331 of that book, that the interior surface portion of the formed article can be encapsulating glass.

In any event, the presence of encapsulating glass as the inner surface layer of a hollow container is of minor importance because loss in increased strength occurs by abrasion of the outer surface of the container. In the present process encapsulating glass does surround base glass at the outer surface portion of the container, at least in those areas that will receive such abuse in normal service because the outer surface portion of the gob includes encapsulating glass along its length, even if not at the ends.

In the various blow-and-blow forming processes the inside surface of the formed container is a pristine surface. Such surface has a substantial strength and thus does not need the ion-exchange treatment. As a matter of fact, the ion-exchange treatment can reduce the strength of such pristine surface.

When the outer surface of a bottle is ion exchanged by immersion in a conventional molten salt in a manner that the molten salt does not flow into the containers, there still can be a reduction of strength by the action of vapors of the ion-exchange medium upon contact with the pristine surface. This can be avoided by the use of an ion-exchange material, such as one of the alkali metal carbonates that are utilized in solid form and can be applied selectively to the outer surface in the process disclosed and claimed in U.S. patent application Ser. No. 529,215 filed on Feb. 23, 1966, and entitled "Process and Product" by Everett F. Grubb (one of the present applicants) and Augustus W. La Due, with common assignee now U.S. Pat. 3,498,773, issued Mar. 3, 1970.

The foregoing disadvantage of ion exchanging a pristine surface does not negate the value of an ion-exchange treatment with molten salts because the containers can be closed to prevent such undesirable action on the pristine surfaces. Furthermore, the increased strength at the outer surface through the ion exchange of the encapsulating glass more than offsets the loss of strength by reaction of such glass surface with the vapors of molten ion-exchange salt. More important is the advantage of retaining sufficient of the increased strength at the outer surface portion during normal service uses that entail some abrasion. This is not affected by the disadvantageous action on the pristine surface inside the glass container.

This preferred embodiment is a process that has a number of advantages. A base glass is conventionally fed by a glass furnace to a number of forehearths. The same or different heavier glasses are added to one or more of the forehearths. Such heavier glass is more amenable to ion-exchange treatment to create a compressive stress of higher maximum value in a surface layer and a greater depth of such layer. The two layers of glass are flowed to the gob feeder so as to provide encapsulated gobs of glass that can be of different depths of encasing glass. All such gobs can be used to make a number of containers of the same shape and size. These different containers can be ion exchanged to different depths for strengthening of the containers by predetermined amounts as desired by packaging customers. This permits a production of smaller quantities of the stronger containers. It avoids the expense of changing the glass furnace composition for a short production run.

Glasses that are more expensive than soda-lime-silica glass, because of cost of different batch materials or higher content of the more expensive materials commonly used, can be utilized for making the containers of greater strength and greater retention of strength. The process avoids the cost of making the entire container of such glass. Thus only 50% or less of the volume of the overall glass of the stronger container is a more expensive glass.

When different encapsulating glasses are added to different forehearths being fed from the same furnace with a base glass, an ion-exchange treatment, standardized as regards ion-exchange medium, time and temperature, of these encapsulated glass containers from the different forehearths can provide different strengths in an economic manner.

The manufacture of containers of uniform glass composition and containing a significant lithium content is relatively expensive because of the cost of batch materials to provide lithium content. This cost can be minimized by using a conventional soda-lime-silica glass as a base glass and using a lithium-containing encapsulating glass. Then the lithium is only in a surface layer that constitutes at least part of the encapsulating glass. In addition to this overall saving of costs of manufacture by minimizing the use of lithium-containing materials, the formed article can be treated to exchange sodium for lithium in at least an outer portion of this encapsulating glass to provide a greater flexural strength and to a greater depth for its retention than obtained by a potassium for sodium exchange using the same glass composition except for the lithium content.

The article of the present invention and obtainable, for example, by the process of the invention has a main body of glass and an encapsulating glass that overlies at least part of the main body of glass and has a substantially higher flexural strength than obtainable by ion-exchange treatment of the encapsulated glass using the same conditions of time and temperature. The encapsulating glass contains two alkali metal oxides and these are present in different mole percents than in the base glass. There are other differences in the compositions of the encapsulating glass and the main body glass, as described above. At least an outer portion of the encapsulating glass has a compressive stress with a maximum value that is greater than obtainable by the same ion-exchange treatment of the base glass.

It is an object of the present invention to provide a process that uses two glasses of different densities, that from these two glasses forms an encapsulated glass gob and then an article with the lighter glass as the main body of the article while the heavier glass overlies at least a substantial part of the lighter glass and that treats the overlying or encapsulating glass to provide a compressive stress in a surface layer of the container where the encapsulating glass is present.

It is a further object of this invention to provide a process that utilizes soda-lime-silica glass in a furnace, that adds a different glass to the forehearth so as to produce an encapsulated glass gob, that forms with conventional automatic forming equipment a container from the gob, and that chemical strengthens the container, while using other forehearths, their associated gob feeders and container-forming equipment to make conventional articles entirely of soda-lime-silica glass that cannot be improved in strength by such chemical-strengthening treatment.

These and other objects of the invention will be apparent to one of ordinary skill in the art from the foregoing general description of the process when taken in conjunction with the more detailed description that follows and that includes examples of ion-exchange treatments. From the reported data including maximum compressive stress values, depths of compressive stress surface layer and flexural strengths obtained by the ion-exchange treatments, a comparative analysis will indicate the improvement obtained by encapsulating a base glass, such as normal soda-lime-silica glass, with a heavier glass that is more suitable for chemical strengthening.

EXAMPLE I

Two glasses, designated glass No. 1 and glass No. 2, were made in the form of rods from canes as follows:

A mixture of the following batch materials was melted in a platinum crucible within a gas-fired furnace using slightly oxidizing conditions with a maximum temperature of about 2900° F. and sufficient time for melting and refining to provide a homogeneous glass. The conventional mechanical stirring was used until fining of the glass was obtained.

For glass No. 1 the mixture used was as follows:

| Batch materials— | Parts by weight |
|---|---|
| Ottawa flint [1] | 3,701.3 |
| Alcoa A–10 alumina [2] | 110.1 |
| Periclase [3] | 199.4 |
| Soda ash | 870.7 |
| Calcium carbonate | 862.3 |
| Potassium carbonate | 22.0 |

For glass No. 2 the mixture used was as follows and the glass was made as described above for glass No. 1:

| Batch materials— | Parts by weight |
|---|---|
| Raw dolomite [4] | 892.1 |
| Ottawa flint [1] | 3,355.8 |
| Spodumene [5] | 408.4 |
| Lithium carbonate | 176.1 |
| Soda ash | 853.4 |
| High-calcite Mississippi limestone [6] | 365.7 |
| Potassium carbonate | 24.2 |

The typical compositions of batch material designated by superscript numbers are as follows on a weight basis:

(1) 99.9+% $SiO_2$.
(2) 99.5% $Al_2O_3$, 0.03% $Fe_2O_3$, 0.1% $Na_2O$, 0.08% $SiO_2$, 0.2% ignition loss at 900° C.
(3) 95.3% MgO, 0.5% $Fe_2O_3$, 2.8% $SiO_2$, 0.3% $Al_2O_3$, 1.1% CaO.
(4) 30.4% CaO, 21.5% MgO, 0.5% $SiO_2$, 0.1% $Al_2O_3$, 0.072% $Fe_2O_3$, 0.023% $P_2O_5$, 0.04% $SO_3$, and the rest is $CO_2$ of the carbonate.
(5) 63.4% $SiO_2$, 26.2% $Al_2O_3$, 7.4% $Li_2O$, 1.0% $Na_2O$, 0.7% $K_2O$, 0.7% iron oxide expressed as $Fe_2O_3$, 0.2% Mn expressed as MnO, 0.5% combined CaO and MgO, and 0.3% ignition loss at 1000° C.
(6) 55.3% CaO, 0.4% MgO, 0.4% $SiO_2$, 0.04% $Al_2O_3$, 0.046% $Fe_2O_3$, 0.03% $SO_3$, 0.008% $P_2O_5$, 0.004% $Cr_2O_3$ and the rest is $CO_2$ as carbonate.

Each glass was cooled to a suitable temperature at which it has the desired vicosity to draw or pull a number of canes. Glass Nos. 1 and 2 of these canes had the following theoretical compositions on a weight basis, calculated from the composition of the batch materials, assuming no loss of ingredients and ignoring minor impurities:

| Ingredient | Glass No. 1, percent | Glass No. 2, percent |
|---|---|---|
| $SiO_2$ | 73.8 | 72.3 |
| $Al_2O_3$ | 2.2 | 2.2 |
| MgO | 3.9 | 3.8 |
| $Li_2O$ | | 2.0 |
| $Na_2O$ | 10.1 | 9.9 |
| CaO | 9.7 | 9.5 |
| $K_2O$ | 0.3 | 0.3 |

Glass No. 1 had a liquidus temperature of 1990° F., a log 4 viscosity of 2000° F., i.e., a viscosity of $10^4$ poises at that temperature, and an annealing point of 1030° F. Glass No. 2 had a liquidus temperature of 1875° F. and a log 4 viscosity of 1740° F.

The drawn cane of each of these two glasses was cooled slowly to room temperature. After their annealing the sample canes, having an average diameter of 0.200±0.005 inch, were cut into 5-inch lengths to make sample rods.

The unabraded flexural strength of glass No. 1 was determined using some of the sample rods. Other sample rods of glass No. 1 were severely abraded by tumbling for 15 minutes in a ball mill containing No. 30 silicon carbide grit. These abraded rods were tested for their flexural strength. The average flexural strength or modulus of rupture for the unabraded glass No. 1 was 19,000 p.s.i. while the average value for the abraded glass No. 1 was 14,000 p.s.i.

Other sample rods of glass No. 1 were preheated to about 750° F. and then immersed in a molten bath of potassium nitrate for 4 hours at about 750° F. (about 400° C.). The rods were removed from the molten bath and to avoid thermal tempering were cooled freely in air to room temperature. The cooled rods, after washing with water to remove an adherent coating of potassium nitrate, were dried. Some of these ion-exchanged rods were severely abraded, as described above, for untreated rods. The unabraded and the abraded ion-exchanged rods were tested for their flexural strength. The average values of unabraded and abraded flexural strength were 22,000 p.s.i. and 12,000 p.s.i., respectively. An examination of a 0.01-inch thick disc cut from an ion-exchanged rod of glass No. 1 revealed a compressive stress surface layer depth of 3 microns and an optical retardation of 56 millicrons per 0.01-inch. The optical retardation value can be converted to approximate corresponding compressive stress by multiplying the optical retardation value by 250 to obtain compressive stress in p.s.i.

Other sample rods of glass No. 1 were preheated to about 750° F. and then subjected to an ion-exchange treatment under the same conditions as described above but using a molten bath of sodium nitrate instead of potassium nitrate. Some of these treated rods were severely abraded as described above. Average values of modulus of rupture or flexural strength of unabraded and abraded ion-exchanged rods were 11,000 p.s.i. and 8,000 p.s.i., respectively. Examination of a disc from another treated sample rod failed to show any compressive stress surface layer and there was no optical retardation.

Sample rods of glass No. 2 were treated as described above for glass No. 1 with sodium nitrate. Some were tested for flexural strength without abrasion and others were tested after the severe abrasion described above. These treated rods of glass No. 2 had an average value of unabraded and abraded flexural strengths of 43,000 p.s.i. and 15,000 p.s.i., respectively. Examination of a disc from another ion-exchanged rod of glass No. 2 showed a compressive stress surface layer depth of 22 microns and an optical retardation of 50 millimicrons per 0.01 inch.

In the case of earlier studies of others on the ion-exchange treatment of other glasses to improve their flexural strength, it has been determined that such severe abrasion using No. 30 silicon carbide grit will substantially reduce or eliminate the increase of flexural strength afforded by ion exchange unless the compressive stress surface layer created by the ion-exchange treatment has a depth of at least 50 microns.

EXAMPLE II

Two other glasses, designated Nos. 3 and 4, were made as described above in Example I but using the following mixtures of batch materials:

| Batch materials | Part by weight | |
|---|---|---|
| | Glass No. 3 | Glass No. 4 |
| Petalite [7] | | 3496.5 |
| Ottawa flint [1] | 2871.0 | 81.1 |
| Periclase [3] | 434.6 | 419.2 |
| Alcoa A-10 alumina [2] | 803.5 | 210.3 |
| Soda ash | 482.8 | 436.0 |
| Calcium carbonate | 1073.4 | 1046.8 |
| Potassium carbonate | 36.6 | 20.9 |

The superscripts refer to the same batch materials as in Example I except for item (7) which is commercial petalite that on a weight percent basis contains: 77.7% $SiO_2$, 16.2% $Al_2O_3$, 4.2% $Li_2O$, 0.4% $Na_2O$, 0.2% $K_2O$, 0.03% iron oxide expressed as $Fe_2O_3$, an ignition loss of 1% and trace impurities.

These glasses had the following compositions expressed as oxides on a weight basis and assuming no loss of ingredients while ignoring minor impurities:

| Ingredient | Glass No. 3 | Glass No. 4 |
|---|---|---|
| $SiO_2$ | 57.3 | 55.6 |
| $Al_2O_3$ | 16.0 | 15.5 |
| MgO | 8.5 | 8.2 |
| $Li_2O$ | | 3.0 |
| $Na_2O$ | 5.6 | 5.4 |
| CaO | 12.1 | 11.8 |
| $K_2O$ | 0.5 | 0.5 |

These glasses had liquidus temperatures of 2135° F. and 2140° F., respectively, and log 4 viscosities of 2000 F. and 1700° F., respectively.

Strength determinations were made on some of the sample rods of glass No. 3 without and after the severe abrasion described in Example I. These values were 17,000 p.s.i. and 12,000 p.s.i., respectively.

The average values of modulus of rupture of other sample rods of glass No. 3 and some rods of glass No. 4 were determined after the 4-hour treatment in molten potassium nitrate at 750° F., as described above, without and after the severe abrasion, as described above. In the case of glass No. 3, the average unabraded and abraded flexural strengths after the potassium nitrate treatment were 18,000 p.s.i. and 14,000 p.s.i., respectively, whereas glass No. 4 after such potassium nitrate treatment the abraded and unabraded modulus of rupture values were 13,000 p.s.i. and 19,000 p.s.i., respectively. A disc from a sample rod of glass No. 3 after the potassium nitrate treatment showed no compressive stress surface layer and no optical retardation, whereas a disc from a sample rod of glass No. 4 after such potassium nitrate treatment had a depth of such layer of 12 microns and optical retardation of 0.01 inch.

The similar treatment of other sample rods of glasses Nos. 3 and 4, but using sodium nitrate instead of potassium nitrate, provided average values of unabraded and abraded flexural strength of 18,000 p.s.i. and 12,000 p.s.i., respectively, for glass No. 3 and 92,500 p.s.i. and 16,900 p.s.i., respectively, for glass No. 4. Glass No. 3 after the sodium nitrate treatment had no compressive stress surface layer and no optical retardation, whereas the treated glass No. 4 had a depth of such compressive stress surface layer of 33 microns and an optical retardation of 120 millimicrons per 0.01 inch.

The lithia-free glass of Example II, namely, glass No. 3, contains an $Al_2O_3$ content (16%) near the lower end of its range in such glasses. However, such glass also contains a high CaO content (12.1%) as well as a somewhat lower MgO content (8.5%). The potassium nitrate treatment has no effect on such composition apparently in view of, at least, the high CaO content and both the low $Na_2O$ content (5.6%) and relatively low $Al_2O_3$ content as compared with other glasses of this type in which the $Al_2O_3$ content can be as high as 25% by weight. Surprisingly the incorporation to this base glass of sufficient $Li_2O$ content to provide only 3% by weight of $Li_2O$ can provide by the subsequent sodium-for-lithium ion exchange an unabraded flexural strength of 92,500 p.s.i. This was using a sodium nitrate treatment. It is also noteworthy that there is practically no increase in flexural strength obtained by a potassium nitrate treatment even though the total content of alkali metal ions smaller than potassium ions in the glass have been increased substantially by the lithia incorporation. $Li_2O$ as 3% by weight is, on a molar basis, the substitution of the equivalent of 6% by weight additional $Na_2O$. However, it is only this 3% by weight of $Li_2O$ as lithium ions that is partially substituted to produce this strength.

Glass No. 3 is a glass within the compositional ranges of a type of glass that is disclosed and claimed in copending U.S. patent application Ser. No. 512,235 filed by Everett L. Grubb (a present applicant), Erwin C. Hagedorn and Joseph R. Monks (present applicants) on Dec. 7, 1965, and entitled "Process, Composition and Product," with common assignee, now U.S. Pat. 3,524,738, issued Aug. 18, 1970. One facet of that invention relates to a process for the manufacture of such glass. In that process a specific mixture of batch materials is used. Such mixture consists essentially of at least one alkali aluminosilicate mineral as a major ingredient and at least one alkaline earth material selected from the group consisting of alkaline earth metal oxide, alkaline earth metal carbonate and alkaline earth aluminosilicate mineral as a minor ingredient, preferably said alkali aluminosilicate mineral major ingredient containing a substantial soda content and said alkaline earth material containing a substantial content of calcia, magnesia or total magnesia and calcia, whereby the glass that is formed has the theoretical composition expressed below. Accordingly, the mixture can contain at least one (1) alkali feldspar, such as soda feldspar, potassia feldspar, and feldspars that are considered as containing both soda and potassia feldspars (such as soda orthoclase and anorthoclase described by P. W. Lee on pp. 16 and 17 in his book entitled "Ceramics" published in 1961 by Reinhold Publishing Corp., New York, N.Y.), (2) nepheline syenite, (3) nepheline, (4) aplite, and (5) lithium spars, such as spodumene and petalite.

In the present invention the choice of these alkali aluminosilicate minerals to make a specific glass is dependent upon the density of the glass vis-a-vis that of the base glass. Usually the mineral will be one to provide sodium as the main alkali metal present in the glass composition.

The Grubb et al. patent application mentioned above states that the batch used in the process of that invention consists essentially on a weight basis of about 55% to about 90% alkali aluminosilicate mineral and about 10% to about 45% of an alkaline earth material as oxide, carbonate and aluminosilicate mineral or mixtures thereof, said carbonate being used to provide said weight percent of oxide, in which the alkaline earth is calcia, magnesia and mixtures thereof. When none of the alkaline earth material is an alkaline earth aluminosilicate, the batch consists essentially on a weight basis of about 75% to about 90%, preferably about 80 to about 95%, alkali aluminosilicate mineral and about 10% to about 25%, preferably about 10% to about 20%, alkaline earth material. The alkali aluminosilicate mineral or mixture of such minerals has in the preferred glass a greater soda than potassia weight content.

The preferred glasses of that invention resulting from the melting and reacting of the batch mixture of raw materials, as expressed above, have the following theoretical composition expressed in ranges on a weight percent basis, wherein the glasses consist essentially of expressed oxides and any compatible materials present are limited to 5% by weight of the total content of oxides expressed below:

| Oxide composition | General range | Preferred range | Especially preferred range |
|---|---|---|---|
| $SiO_2$ | 43–63 | 51–63 | 54–63 |
| $Al_2O_3$ | 14–25 | 15–22 | 17–22 |
| CaO | 0–30 | | |
| MgO | 0–20 | | |
| Total CaO and MgO expressed as CaO | 10–30 | 10–22 | 10–12 |
| $Na_2O$ | 3.5–10 | | |
| $K_2O$ | 0–5 | | |
| Total $Na_2O$ and $K_2O$ expressed as $Na_2O$ | 5–15 | 7–14 | 8–13 |

However, being within these general ranges does not provide a glass having suitable working characteristics etc. Accordingly, an additional limitation is the log viscosity at the liquidus temperature of the glass, i.e., the logarithm (to the base 10) of the viscosity in poises at that temperature shall be at least 2.3, and preferably at least 3.4 and it is especially preferred that it be at least 4. For this reason there are presented above preferred ranges and especially preferred ranges for the oxides of the composition, but again being within these ranges do not necessarily give a glass with the minimum log viscosity at the liquidus that is desired.

The preferred glass that is present in that invention has the following typical properties that are obtained by the proper choice of the specific weight percent of the raw or batch materials.

Typical properties:
    Liquidus (° F.) _____ 2035–2320.
    Log viscosity at liquidus _____ at least 2.3.
    Log viscosity—
        Of 2 at ° F. _____ 2345–3080.
        Of 3 at ° F. _____ 2065–2600.
        Of 7 at ° F. _____ 55–68.
    Cooling time, sec. _____ 55–68.
    Thermal expansion
        $\alpha \times 10^7$ (0–300° C.) _____ 66–88.5.

It is stated in that patent application that these glasses have cooling times that are substantially below the cooling time of the conventional soda-lime-silica glass for which an average value is 96 seconds. The term "cooling time" is used as a yardstick to compare the potential working properties of a glass with those of other glasses. To obtain a cooling time, the temperatures, at which a glass has a log viscosity in poises of 3 and a temperature having a log viscosity in poises of 7, are used as the limits of the forming range. As a glass is cooled from the temperature at which its viscosity is suitable for working, the sooner it reaches a temperature at which it has viscosity at which the article will not sag, the shorter is the time that it should be retained in a mold for most efficient use of the mold. Thus, the shorter the cooling time the faster can be the rate at which the glass articles are made. The term "setting rate" is a term that is used as an equivalent for the term "cooling time."

Because this type of glass by proper choice of the ingredients has a cooling time within the range indicated above as compared with a cooling time of 96 seconds for conventional soda-lime-silica glass of a present conventional composition, the encapsulating glass sets faster than that of the base glass of conventional flint glass composition. This provides various advantages that are apparent to those skilled in this art in view of the present disclosure.

EXAMPLE III

Sample rods were made from canes of glass that correspond in composition to glass No. 7 in Table III of Reissue U.S. Pat. No. 25,456 mentioned above. This glass, herein called glass No. 5, contains on a weight basis, ignoring minor impurities, but did not contain colorant metal oxides, namely, chromium oxides and cobalt oxides, that are present in glass No. 7 of the reissue patent, as follows: 63.4% $SiO_2$, 9.5% $Al_2O_3$, 0.1% $Fe_2O_3$, 8.6% CaO, 0.1% MgO, 15.9% $Na_2O$ and 2.4% $K_2O$. These sample rods were immersed in molten potassium nitrate at 750° F. for 18 hours. The treated rods had a surface compression of 8,000 p.s.i. and a compressive stress surface layer depth of only 20 microns.

EXAMPLE IV

Various glass compositions of the preferred embodiment of the invention of the Grubb et al. patent application Ser. No. 512,235, were immersed in molten potassium nitrate at 750° F. for 20 hours, and the maximum compressive stress in the surface layer ranged from 2,000 to 28,000 p.s.i. with most of the values being above 10,000 p.s.i. In addition, almost all of the ion-exchanged glass rods had compressive stress surface layer depths of at least 40 microns. The best results were obtained when the alkaline earth aluminosilicate mineral was used in an amount of 90% of the batch used to make the glass as compared with the use of 80%.

EXAMPLE V

Expecially preferred glass compositions of the invention of the Grubb et al. patent application Ser. No. 512,235 and made from 90% by weight of either feldspar or nepheline-syenite and 10% mixed calcite-dolomite limes were ion exchanged with molten potassium nitrate at 850° F. and 1050° F. for either 15 minutes or 1 hour. Examples of the treated rods indicated that higher surface compressive stresses were obtained at the higher temperatures and that the depth of the ion-exchange penetration increased at the higher temperatures, i.e., higher as compared with 750° F.

On the basis of these ion-exchange treatments of 7 glasses, one was chosen for more detailed studies. It was glass No. 39 of that patent application and herein called glass No. 6. That glass contained on a weight basis with the values rounded off to the first decimal point: 54.8% $SiO_2$, 21.3% $Al_2O_3$, 6.1% CaO, 4.1% MgO, 9.1% $Na_2O$, 4.6% $K_2O$, and 0.1% $Fe_2O_3$. That glass had a liquidus temperature of 2060° F., a log viscosity at the liquidus temperature of 4.55 and a log viscosity of 4 at 2180° F. Its cooling time was 60 seconds and its average expansion coefficient between (0° F. and 300° C.) was $$71.4 \times 10^{-7}/° C.$$

It was made using, on a weight basis, 90% nepheline-syenite and 10% dolomite lime. That glass is referred to herein as glass No. 6.

Sample rods of this glass No. 6 were subjected to ion-exchange treatment for various periods of time and for various temperatures with one or the other of two different potassium-containing ion-exchange media. The

TABLE I

| Temp., ° F. | ¼ hr. | | ½ hr. | | 1 hr. | | 2 hrs. | | 4 hrs. | |
|---|---|---|---|---|---|---|---|---|---|---|
| | M.ps.i. | μ | Mp.s.i. | μ | Mp.s.i. | μ | Mp.s.i. | μ | Mp.s.i. | μ |
| 1,000 | 26 | a 26 | 14 | a 30 | 23 | a 34 | 37 | a 50 | 36 | a 68 |
| 1,050 { | 15 | 21 | 22 | 48 | 19 | 72 | 26 | 80 | 27 | 90 |
| | 19 | a 30 | 17 | a 38 | 19 | a 60 | 33 | a 80 | 35 | a 100 |
| 1,100 { | 18 | 30 | 15 | 36 | 16 | 50 | 18 | 60 | 16 | 86 |
| | 26 | 25 | 19 | 40 | | | 11 | 83 | 19 | 100 |
| 1,150 | 11 | 35 | 12 | 35 | 10 | 68 | 6 | 95 | 9 | 130 |
| 1,250 | 3 | 30 | 3 | 80 | 2 | 55 | Nil | | Nil | | a Exchange in $KNO_3$ bath; all others were exchanged in an eutectic mixture by weight of 32.8% NaCl and 67.2% $K_2SO_4$.

depth in microns (μ) and magnitude of the induced compressive stress in thousands of pounds per square inch (M.p.s.i.) are shown in Table I.

On the basis of ion-exchange treatments it appeared that the best exchange conditions for this glass No. 6 where 1000 to 1050° F. for 3–4 hours.

A glass made from a batch of 90% by weight spruce pine feldspar and 10% by weight magnesia was ion exchanged with potassium nitrate at 1050° F. for 60 minutes. The latter glass rods had a compressive stress layer of 38 microns. The five-inch rods drawn from this glass in molten state, after the ion exchange, had an unabraded flexural strength of 79,800 p.s.i. After an abrasion with a blast of grit, rods of this ion-exchanged glass had a flexural strength or modulus of rupture of 25,600 p.s.i. which indicates a substantial retention of flexural strength.

EXAMPLE VI

Sample rods were made from glass cane obtained from molten glass having the following theoretical composition, expressed as oxides on a weight percent basis:

| | |
|---|---|
| $SiO_2$ | 48 |
| $Al_2O_3$ | 26 |
| $Na_2O$ | 18 |
| $TiO_2$ | 8 |

This glass has a liquidus temperature of 2215° F. and a log 4 viscosity of 2210° F. It has an average linear coefficient of expansion (0° C.–300° C.) of $90 \times 10^{-7}/°C$. This glass is an example of the type of glass disclosed and claimed in copending U.S. patent application Ser. No. 371,089 filed by William E. Smith on May 28, 1964, and entitled "Glass, Ceramics and Method," with common assignee now U.S. Pat. 3,522,828, issued Aug. 4, 1970. Such glass is thermally crystallizable glass. Its manufacture and illustrative batch materials are described in that Smith patent application.

Sample rods of this thermally crystallizable glass, herein referred to as glass No. 7, were immersed in a bath of molten potassium nitrate maintained at 400° C. for different periods of time, namely, 4, 8, 16, 24, 32 and 64 hours. For all six time periods of ion-exchange treatment the rods were found to have a compressive stress surface layer. The depth of this layer after 4, 8, 24 and 64 hours of treatment was 36+, 45, 63 and 100 microns, respectively. For sample rods after 4, 8, 24 and 64 hours of immersion, followed by the abrasion, by tumbling with No. 30 silicon carbide grit as described above, had modulus of rupture of 22,000 p.s.i., 63,000 p.s.i., 125,000 p.s.i. and 114,000 p.s.i., respectively. The lower flexural strength after 64 hours of teratment as compared with 24 hours of treatment is not unexpected. It is well known in the art of ion exchange of glasses that if the process can be conducted for too long a period of time, in which case ion exchange will start to occur in the main body of the glass by diffusion etc., and this will start a decrease of compressive stress in the surface layer.

EXAMPLE VII

Sample rods were made from cane obtained from a molten glass having the following composition on a weight percent basis: 61.1% $SiO_2$, 17.3% $Al_2O_3$, 1.6% CaO, 10% MgO, 6% $Na_2O$ and 3.6% $K_2O$. Immersion of these sample rods in potassium nitrate at 750° F. for 20 hours provided a surface compressive stress layer having a depth of 45 microns and a maximum stress value of 19,000 p.s.i. After abrasion with No. 30 silicon carbide as described above, these treated rods had an average abraded modulus of rupture of 20,700 p.s.i. Other treated rods, that were not abraded had an average unbraded modulus of rupture of 62,200 p.s.i. when tested on an Instron tester with 4-point loading. (All other strength values reported in this patent application are based on tests performed as described later using the Tinius-Olsen equipment with 3-point loading.)

EXAMPLE VIII

Sample rods of glass were made from cane drawn from a molten glass having the following theoretical composition, expressed as oxides in weight percent:

| | |
|---|---|
| $SiO_2$ | 72.0 |
| $Al_2O_3$ | 1.9 |
| CaO | 9.6 |
| MgO | 4.2 |
| $Na_2O$ | 11.5 |
| $K_2O$ | 0.4 |

This glass herein called glass No. 8 had an annealing point of 1033° F. and a strain point of 986° F. These sample rods were preheated to 700° F. in an oven. Immediately upon removal from the oven they were sprayed with one of various aqueous salt solutions. The salt content of the aqueous solutions was saturated, and these solutions were prepared as follows: These solutions were prepared by heating water to boiling temperature and adding salt or mixture of salts to dissolve as much salt as possible. The aqueous solution was cooled to room temperature to provide saturation solutions in the presence of solid salt.

Five types of aqueous solutions were used and three of them contained only one potassium chloride and potassium carbonate in a molar ratio of $K_2CO:KCl$ of 1:1 and 1:4, respectively. The salt of the solution, the temperature maintained for the salt layer to react with the glass for ion exchange, the time for this maintenance in the case of the oven treatment and the modulus of rupture that was determined as described above using the Tinius-Olsen machine without any abrading treatment are tabulated below. The time for the treatment in the annealing lehr is not shown. The overall time was about 40 minutes, but the rods were at the various temperatures during their travel.

A temperature profile in a normal annealing lehr has been determined using a traveling thermocouple attached to the bottom of a bottle. This temperature profile determination indicates that for about the last one-half of the initial 5 minutes the temperature of the botom of the bottle was rising from about 980° F. and then in the next 5 minutes the bottom of the bottle was at a temperature between 1000° F. and 1025° F. After the first 10 minutes the temperature decreases. At the end of about 15 minutes overall, the temperature was reduced to 900° F. and at the end of 20 minutes overall it was reduced to about 600° F. followed by still further cooling. The total travel time through the lehr is about 40 minutes. The temperature in the sidewall portion of the bottle passing through the lehr will be ahead of the temperature of the bottom during the heat-up period and will retain that temperature of the bottom during the cooling period.

| Salt in sol'n sprayed | Temperature, °F. | Time in minutes | Flexural strength, p.s.i. |
|---|---|---|---|
| $K_2CO_3$ | 1,025 | 30 | 33,000 |
| $K_2CO_3$ | 975 | 30 | 36,000 |
| $K_2CO_3$ | Annealing lehr | | 40,000 |
| KCl | do | | 17,000 |
| $K_2SO_4$ | do | | 15,400 |
| $K_2CO_3:KCl$ | do | | 28,000 |
| $K_2CO_3:4KCl$ | do | | 20,000 |

Rods of this glass, but without the foregoing salt-and-heat treatment and without any abrading, had a flexural strength of 16,000 p.s.i. Other samples of the rods were not sprayed but were passed through the annealing lehr, and they were found to have a flexural strength of 13,500 p.s.i.

The treatment at 1025° F. with $K_2CO_3$ for 30 minutes provides a compressive stress surface layer depth of only 20 microns and for the same time at 975° F. the depth is only 18 microns. The compressive stress optical retardation values of 210, 180 and 150 millimicrons per 0.01 inch after the treatment at 1025° F. for 5, 15 and 30 minutes, respectively, indicated that treatment for a longer period of time would provide eventually a surface layer having a tensile stress.

EXAMPLE IX

A glass, herein called glass No. 9, was made in a large continuous furnace or tank lined with a high-alumina refractory (Monofrax M) to make a pressed glassware product. The glass had the following analyzed composition on a weight percent basis:

| | |
|---|---|
| $SiO_2$ | 70.4 |
| $Al_2O_3$ | 16.8 |
| MgO | 4 |
| $Li_2O$ | 3.5 |
| $ZrO_2$ | 1.3 |
| $TiO_2$ | 1.8 |
| $P_2O_5$ | 1.5 |
| F | 0.09 |
| $Na_2O$ | 0.5 |
| $As_2O_3$ | 0.15 |

The glass was made by melting at a temperature of 2900° F. for about 43 hours a mixture of the following batch materials using a slight excess of air at an oxidizing atmosphere: petalite (contains 77.7% $SiO_2$, 16.2% $Al_2O_3$, 4.2% $Li_2O$, and minor amounts of other alkali metal oxides and other impurities); flint (99.9+% $SiO_2$); Alcoa A–10 alumina (99.5% $Al_2O_3$ and minor impurities); periclase (95.3% MgO, 0.5% $Fe_2O_3$, 2.8% $SiO_2$, 0.3% $Al_2O_3$, 1.1% CaO); Florida zircon (66% $ZrO_2$, 33.5% $SiO_2$, 0.25% $TiO_2$, 0.1% $Fe_2O_3$); titanox (substantially pure $TiO_2$); aluminum metaphosphate (substantially pure, except about 1% ignition loss); lithium fluoride (essentially pure LiF); arsenic trioxide, niter and water.

This glass had an annealing point of about 1220° F. Cane was pulled from the glass melt and a number of glass rods about 3/16 inch in diameter were prepared from the cane. These rods at temperatures between 700 and 900° F. were sprayed with a saturated sodium chloride aqueous solution to produce a very fine, thin coating of sodium chloride on the rods. The coated rods were heated for one hour at 900° F. The rods were cooled slowly and then washed with water to remove the salt layer. An ion exchange occurred whereby lithium ions in the glass were replaced by sodium ions. The depth of the compressive stress surface layer was approximately 50 microns. These rods were found to have an average flexural strength of 45,000 p.s.i. whereas glass rods that were not subjected to the sodium chloride treatment at the elevated temperature had an average flexural strength of only 19,800 p.s.i. None of these rods was subjected to any abrasion treatment prior to testing for strength.

Studies have shown that the greater is the depth of the layer of compressive stress, the greater is the resistance to loss of increased strength by abuse. This depth of layer should be at least 10 microns, as mentioned above, and is preferably at least 15 microns. The greater is the compression retardation, the greater is the increase in strength. However, a bottle having a greater compression retardation as a result of the ion-exchange treatment than another bottle that has a greater depth of compressive stress layer is not necessarily better from the standpoint of commercial use. Retention of increased strength, during use, is assured by layer depth and not by the amount of compressive stress determined as optical retardation.

Examples I, III and VIII describe ion-exchange treatment of flint glasses, i.e., soda-lime-silica glasses, that can be used as the base glass in the process and as the main body of the article of the present invention. The other glasses are more dense, i.e., have a higher specific gravity than flint glass and thus are useful, as mentioned above, as the encapsulating glass. Such glass is added at the forehearth to provide the lower layer of glass that flows to the gob feeder in the present process and thus also is the encapsulating glass of the present article. The glasses of Examples II, IV, V and VII are of the type disclosed and claimed in the Grubb et al. patent application Ser. No. 512,235, now U.S. Pat. 3,524,738, issued Aug. 18, 1970. The glasses of Examples VI and IX are thermally crystallizable glasses.

Flint glass has an expansion coefficient (0° C. to 300° C.) of about $85 \times 10^{-7}/°$ C. Some of the glasses of the Grubb et al. type have expansion coefficient substantially lower than that of flint glass, as can be seen from the range presented above. Glass No. 7 has an expansion coefficient slightly higher than that of flint glass, but the difference is not too great to preclude its use in the present invention. Glass No. 9 has an expansion coefficient substantially less than that of flint glass.

Glass No. 9 is a composition within the class of thermally crystallizable glass composition that are disclosed and claimed in copending U.S. patent application Ser. No. 352,958 filed on March 18, 1964, by William E. Smith and entitled "Glasses, Ceramics and Method," with common assignee now U.S. Pat. 3,380,818, issued Apr. 30, 1968. These Smith glasses generally have average coefficients of linear thermal expansion (0° C. to 300° C.) between about $35 \times 10^{-7}/°$ C. and $50 \times 10^{-7}/°$ C. Most of these compositions have coefficients between about $$38 \times 10^{-7}/C.$$

and $42 \times 10^{-7}/°$ C.

Numerous other classes of glass compositions are suitable for use as encapsulating glass in the process and the article of the present invention. Another example is the class of thermally crystallizable glass compositions disclosed in copending U.S. patent application Ser. No. 464,147, filed June 15, 1965, by Clarence L. Babcock, Robert A. Busdiecker and Erwin C. Hagedorn, with common assignee entitled "Product and Process for Forming Same" now abandoned. This class of glass composition contains the following ingredients:

| | Percent by weight |
|---|---|
| $SiO_2$ | 50–75. |
| $Al_2O_3$ | 16–35. |
| $Li_2O$ | 3–5.5. |
| Nucleating Agent | Variable. |
| $Li_2O$ and nucleating agent | At least 5.5. |

In the case of the glass compositions of the Smith patent application Ser. No. 352,958, now U.S. Pat. 3,380,818, they contain, on a percent by weight basis of:

| | |
|---|---|
| $Si_2O$ | 66–73 |
| $Al_2O_3$ | 15–19 |
| $Li_2O$ | 2.5–4 |
| MgO | 3–7.7 |
| $ZrO_2$ | 1–7.7 |
| $TiO_2$ | 1–>2.4 |
| $SnO_2$ | 0–1.7 |
| $P_2O_5$ | 0–3 |
| BaO | 0–5 |
| ZnO | 0–3 | where the total weight percent of $ZrO_2$, $TiO_2$, $SnO_2$ and $P_2O_5$ is at least 2.8, and the total weight percent $Li_2O$ and MgO is 6.3 to 10.5.

A study of the results described above for the comparable ion-exchange treatment of the various glasses in Examples I through IX results in a number of conclusions. The heavier glasses are ion exchanged to provide, as compared with the flint glasses, a greater unabraded strength or at least a greater abraded strength, the latter indicating a greater degree of retention of such increased flexural strength. Often the compressive stress in the surface layer was greater for these heavier glasses than for flint glass with comparable ion-exchange treatment, but as explained above, two types of glasses can have about the same compressive stress but different depth of compressive stress surface layer. The depth is the more important factor insofar as desirable property related to normal service use is concerned.

The comparison indicates that a substantial improvement in flexural strength and a substantial retention of such increased strength can be obtained by the ion-exchange treatment of flint glass modified by the incorporation of $Li_2O$ content. This improvement of flint glass, as regards chemical strengthening, is an invention that is disclosed and claimed in U.S. patent application Ser. No. 605,990, filed Dec. 30, 1966, now U.S. Pat. No. 3,490,885, issued Jan. 20, 1970.

Although improvement in the chemical strengthening of flint glass can be accomplished by such incorporation of $Li_2O$ with sodium-for-lithium exchange that is thus possible instead of potassium-for-lithium exchange, a comparison of its strength without abrasion and a similarly modified and treated Grubb et al. glass indicates a substantially higher flexural strength (glass No. 4 versus glass No. 2). The depth of ion exchange of glass No. 4 is about 50% greater. Of course, part of the greater depth may be due to the higher $Li_2O$ content, but the overall alkali metal oxide content is much less. The abraded strength is only about 19,000 p.s.i. greater for glass No. 4, but the abrasion treatment that was used, was substantially more severe than in encountered in normal service use. Accordingly, a greater retention of increased strength would result in the use of glass No. 4 as compared with glass No. 2 after such ion-exchange treatment.

Although there is the substantial strength increase of flint glass by the incorporation of $Li_2O$ with subsequent ion exchange, the manufacture of a glass bottle entirely of such composition requires the use of $Li_2O$ with subsequent ion exchange, the manufacture of a glass bottle entirely of such composition requires the use of $Li_2O$ for the entire glass of the article. Instead of modifying the base glass, the process of the present invention provides an outer glass than can give the desired increase of flexural strength without adding to the cost of the central or main body portion of the glass article by the presence of that portion of $Li_2O$. Of course, the encapsulating glass can contain lithia as exemplified by glass No. 4 to give the additional flexural strength. However, the cost of $Li_2O$ incorporation is lower because it is incorporated in the encapsulating glass. By such $Li_2O$ incorporation there can be a sodium-for-lithium exchange rather than a potassium-for-sodium exchange. For certain products this can be desirable because of expected better chemical durability.

The data presented above show the advantage of using a thermally crystallizable glass that has $Li_2O$ as the alkali metal oxide that becomes part of the crystalline phase when the glass is in situ crystallized by a suitable heat treatment. With such crystallizable glass a sodium-for-lithium exchange can be utilized.

In the foregoing embodiment of the present invention articles are obtained that are noncrystalline glasses although some are thermally crystallizable. As used herein, the term "glass" means those inorganic glasses that (1) are not controllably crystallizable, and thus can be devitrified as the term is normally used, to form crystalline material usually in a matrix of a glass having a composition determined by the initial composition and by the composition of the crystalline material; (2) are controllably crystallized by a heat treatment; or (3) have been controllably crystallized by a heat treatment. Glass that is controllably crystallizable is commonly referred to as thermally crystallizable glass composition. A crystallized glass is commonly referred to as a glass-ceramic.

The illustrative glasses and other glasses that are suitable as encapsulating glasses are relative to flint glass by being heavier than flint glass and by having the other requisite properties discussed earlier. However, such glasses have densities that differ and thus some combinations of these as base glass and as encapsulating glass can be used.

Of course, the process can be modified when using different thermally crystallizable glasses of different densities as base glass and encapsulating glass. The process can be modified, if desired, to include a controlled heat treatment to convert the glasses to their corresponding glass-ceramics. In this modified aspect of the present embodiment the encapsulating glass is also such that its corresponding glass-ceramic will have a lower expansion coefficient than the glass-ceramic obtained from the base glass. U.S. Pat. No. 2,920,971 describes many thermally crystallizable glass compositions that are converted to glass-ceramics of higher coefficients than the thermally crystallizable glasses. Others have glass-ceramics with substantially lower expansion coefficients than the thermally crystallizable glasses from which they are obtained by controlled heat treatment. Others have no substantial change as a result of the crystallization. In the first case, the glass should be chosen as the base glass. In the other two cases, such glass should be used as the encapsulating glass, although dependent on the actual choice of encapsulating glass-ceramic, another one of the two types can be the base glass-ceramic. The controlled heat treatment of the ion-exchanged article would provide further increase in flexural strength by virtue of the increase in the difference between the expansion coefficients of the two glass-ceramics. In certain cases at least, ion exchange can precede the in situ crystallization. Then the thermally crystallizable glass of Smith patent application Ser. No. 371,089, now U.S. Pat. 3,522,828, issued Aug. 4, 1970, can be readily used as encapsulating glass with suitable choice of thermally crystallizable base glass of about the same or a higher expansion coefficient. Of course, the main or entire contributor to the compressive stress can be the ion-exchange treatment. If the base glass increases its expansion coefficient more than this Smith glass, as modified by the ion exchange, upon their conversion to glass-ceramics, some additional compressive stress in the encapsulating glass-ceramic will be produced.

Some glass-ceramics, such as those of the invention of the Smith patent application Ser. No. 371,089, now U.S. Pat. 3,428,513, issued Feb. 18, 1969, are not readily ion exchangeable, at least at normal elevated temperatures and thus can be the base glass. In such case the encapsulating glass-ceramic chosen is one that is readily ion exchanged. An example of particularly suitable glass-ceramics are those within the class of glass-ceramics that are used in the ion-exchange process disclosed and claimed in copending U.S. patent application Ser. No. 362,481 filed by Robert R. Denman on Apr. 24, 1964, and entitled "Ceramics and Method," with common assignee, now U.S. Pat. 3,428,513, issued Feb. 18, 1969. The compositions of these glass-ceramics contain oxides in the following weight percent ranges:

| | |
|---|---:|
| $SiO_2$ | 68–72 |
| $Al_2O_3$ | 16–18 |
| $Li_2O$ | 3–4 |
| MgO | 3–5 |
| $ZrO_2$ | 1–1.7 |
| $TiO_2$ | 1.2–2.4 |
| $P_2O_5$ | 0.8–2 |

These glass-ceramics are within a broader class that are claimed as glass-ceramics by the Smith patent application Ser. No. 352,958, now U.S. Pat. 3,380,818.

With the article in which both the base glass and the encapsulating glass are glass-ceramics in accordance with the limitations expressed above, the ion-exchange treatment can substitute an alkali metal ion with larger or smaller alkali metal ions, usually the latter. They, as in the case of the ion exchange of noncrystalline glass, are not necessarily adjacent to the substituted ions. For example, potassium ions or sodium ions can replace lithium ions. Lithium ions can replace sodium ions and potassium ions.

In this preferred embodiment of the present process, glass encapsulated by a different glass flows out the orifice of a gob feeder. That part of the process is broadly old in view of the process described in U.S. Pat. No. 2,500,105. In the process of that patent two glasses of different expansion coefficients are fed above and to the orifice as separated streams. The feeding of the glasses uses a rotating bowl having a bottom orifice. Encapsulated glass gobs are obtained and these are formed into laminated hollow glass articles. In the process of the patent the glass that is the encapsulating glass has a higher coefficient of expansion than the glass of the main body. It is claimed that the glass article has a greater strength due to this difference in expansion coefficients.

In the present process it is not necessary that the two glasses have different coefficients of expansion although such difference can be utilized to provide additional compressive stress. The main compressive stress is afforded in the present process primarily by the later ion exchange and the depth of such stress is greater than similar ion-exchange of the base glass. Thus the present process can utilize two glasses having the same expansion coefficient. The encapsulating glass can even have a somewhat higher expansion coefficient than the base glass. The process is the combination of the making of an encapsulated article with particular requisites as to the two glasses and the subsequent ion-exchange treatment. This selection of the two glasses on the basis of their ion exchangeability provides at least one of the differences of the present process over that of U.S. Pat. No. 2,500,105.

In the preferred embodiment of the present process it is necessary that the encapsulating glass be heavier than that of the base glass because this process provides two layers of molten glass in the forehearth that flow to the gob feeder and out its orifice. These two layers of different glasses are provided by a base glass from a glass furnace and a heavier glass added at the forehearth. The advantages of such forehearth addition have been described earlier.

S. S. Kistler in a paper in the Journal of the American Ceramic Society, 45, No. 2, at pp. 59–68, and Research Corp. in British Pat. No. 917,388 describe an ion exchange process. The British patent mentions the following specific alkali metal inorganic salts that are suitable: $NaNO_3$; $KSCN$; $KNO_3$; $K_2S_2O_7$; $RbNO_3$. These are used in a molten form or as a solution in an organic, non-aqueous ionizing solvent, e.g., acetamide. As described in British Pat. No. 917,388, the process comprises immersing the glass in a substantially anhydrous fluid bath containing alkali metal ions having an ionic diameter greater than the ionic diameter of alkali metal ions contained in the glass at a temperature not exceeding the strain point of the glass until a substantial portion of the alkali metal ions in the surface layer of the glass have been replaced by alkali metal ions of greater ionic diameter. U.S. Pat. No. 2,779,136 discloses the other ion-exchange process in which the smaller alkali metal ion replaces a larger alkali metal ion.

The ion-exchange treatment of the present process when substituting a larger alkali metal ion for smaller alkali metal ions in the glass uses, as a maximum elevated temperature, a temperature of about 50° C. above the annealing point of the encapsulating glass. If it is glass-ceramic, the maximum temperature is about 1400° F. The elevated temperature is usually at least 200° C. and preferably at least 350° C. When exchanging a smaller ion for a larger ion the temperature is usually above the strain point of the glass.

The period of time for the ion-exchange treatment is between a few seconds and many hours, e.g., 24 hours, dependent on the glass, the ion-exchange medium, etc.

For the manufacture of soda-lime-silica glass containers, i.e., containers of flint glass, typical glass temperatures in the glass furnace and the gob feeder are as follows: 2800° F. in the melter section of the furnace; 2300° F. in the refiner section of the furnace; 2230° F. in the bowl area of the feeder; and 2350° F. at the orifice of the feeder. The higher temperature of the glass at the orifice as compared with that in the bowl is due to the use of an electric ring heater at the orifice. In this typical case, the temperature of the gob to produce a 6-ounce bottle is 2170° F. The general temperature in the forehearth is generally intermediate the refiner temperature for the glass and that of the glass in the bowl of the feeder section.

Reference has been made to flexural strength and values have been given. The flexural strengths or modulus of rupture values were determined using a Tinius-Olsen testing machine. This machine applies a measured load through a single knife edge to the center of the sample rod supported on two knife edges (3-point loading). The load is applied at a constant rate of 24 pounds per minute until failure occurs, with a marker indicating the highest load applied to the point of failure. A dial micrometer calibrated in inches and equipped with a bar contact instead of a point contact is used to measure the maximum and minimum diameters at the center of the sample to an accuracy of 0.0005 inch. Since few cane samples are perfectly round, the load is applied normal to the maximum diameter and the standard formula for an elliptical cross-section is used in calculating the modulus of rupture (MR) as follows:

$$MR = \frac{\text{Load (lbs.)} \times 8 \times \text{span (in.)}}{(D_1^2 \times D_2)\pi}$$

The modulus of rupture in this formula give the flexural strength in pounds per square inch of cross sectional area at failure.

In another embodiment of the present process the compositions of the encapsulating glass added at the forehearth and the base glass from the furnace differ in their $Li_2O$ content. The encapsulating glass has a higher $Li_2O$ content that provides this lower expansion coefficient than that of the base glass. The other glass has a $Na_2O$ content, the $Li_2O$ of the encapsulating glass is preferably the predominant alkali metal content on a molar basis.

As a result of the foregoing differences in the compositions of the two glasses in this embodiment of the present process there is a different, better stress pattern from the surface of the encapsulated glass article to the center line of the thickness of the article, as a result of alkali metal ions diffusing between the glasses, than that obtained using two glasses that do not have such differences in alkali metal oxide contents.

As mentioned in a later-described embodiment in which a glass article is made of said base glass bonded to a coating of a glass utilized in the present embodiment. By heat treatment the alkali metal ions diffuse between the adjacent portions of the two glasses. In that later embodiment in the absence of such diffusion there is a compressive stress of inwardly decreasing value in the encapsulating glass to its juncture with the base glass. There is a tensile stress in the base glass. The tensile stress increases inwardly of the base glass and then decreases to the other surface of the base glass. That surface is practically free of stress. Thus there is at the juncture a sharp change from compressive stress to tensile stress.

By virtue of the heat treatment with consequent diffusion of lithium ions from the coating glass to the base glass and larger alkali metal ions in the other direction there is obtained a desirable stress gradient in which the compressive stress decreases from the outer surface of the encapsulating or coating glass at a greater rate. Thus it has a tensile stress in its portion adjacent to the juncture of the coating glass and the base glass. The tensile stress in the base glass is a low value at that juncture and increases in value up to about half the distance to the other surface of the base glass. The tensile stress from that point decreases. The other surface of the base glass is practically free of stress.

The diffusion of lithium ions is from the coating glass into the adjacent portion of the base glass with a balancing diffusion of larger alkali metal ions from that portion of the base glass to the adjacent portion of the coating glass. Such diffusion reduces the difference in the expansion coefficients of the outer portion of the base glass and the inner portion of the coating glass. The replacement of lithium ions for sodium ions in the base glass lowers the expansion coefficients. The replacement of lithium ions by sodium ions increases the expansion coefficient of that inner portion of the coating glass.

Such diffusion of alkali metal ions between the two glasses can occur in embodiment of the present process while the two glasses are flowing as two layers in contact with each other through the forehearth and in the feeder zone toward the orifice. The high temperatures in those zones permit with certain combinations of the two glasses a satisfactory rate of diffusion.

In a further embodiment of the present invention, two glasses having a difference in expansion coefficients also differ in alkali metal oxide contents as expressed in the last-mentioned embodiment of the process. These glasses are placed in contact with each other. During their contact the glasses are heated at an elevated temperature that is sufficient to bond the two glasses, e.g., as flat plates to each other. During this bonding action the alkali metal ion diffusions provide the improved stress pattern mentioned above. After such bonding with diffusion, the resultant article is treated with an ion-exchange medium to provide for a greater compressive stress than was initially provided by the difference in expansion coefficients. This treatment is for the glass of lower expansion. Such ion-exchange treatment can include the immersion of the article of these two bonded glasses so that the glass of a higher expansion coefficient is also in contact with the ion-exchange medium. However, it is least amenable to ion-exchange treatment. In such case, the glasses can be chosen from those glasses utilized as base glass and as encapsulating glass, as disclosed above, e.g., with reference to the first embodiment of the process of the present invention.

The foregoing description of the present invention has referred to various copending U.S. patent applications having common assignee. Their disclosures are hereby incorporated by reference.

Various terms, including "strain point" and "annealing point" have been used in this description. The definitions of these terms are well-known in the art and in the published literature.

In view of the foregoing examples in view of other description of embodiments of the process of the present invention, various modifications of the present invention will be apparent to one of ordinary skill in the art. The examples and amplified description are presented merely for an illustration of the invention and not by way of limitation of the invention, which is limited only by the claims that follow.

What is claimed is:

1. A process for making a glass article comprising two bodies of glass integrally bonded to each other throughout their abutting areas with one of said glass bodies having a compressive stress and the other body having a tensile stress, which comprises
    (a) making a molten base glass comprising $SiO_2$, $Al_2O_3$ and an alkali metal oxide,
    (b) making a molten encapsulating glass comprising $SiO_2$, $Al_2O_3$ and an alkali metal oxide, having a composition which is different from that of said base glass, and wherein the alkali metal ions are smaller than in said base glass,
    (c) flowing a layer of said molten base glass together with, but not admixed with a layer of said molten encapsulating glass through a forehearth into a gob feeder zone, under conditions to avoid mixing of the two glass layers, said layers remaining stratified while flowing to the gob feeder zone,
    (d) forming a gob of glass from said glass layers in said gob feeder zone, said gob consisting essentially of a main body of said base glass encapsulated within said encapsulating glass throughout at least a major part of the length of said gob,
    (e) forming a shaped glass article from said glass gob, said article consisting essentially of a main body of said base glass encapsulated at least at a substantial part of its outer surface by said encapsulating glass and integrally bonded thereto,
        (1) the density of said base glass being less than the density of said encapsulating glass at the temperature while said layers are flowing to the gob feeder zone,
        (2) the coefficient of thermal expansion of said encapsulating glass being less than that of said base glass,
        (3) the molten encapsulating glass having a higher surface tension than that of the base glass at the temperature while said layers are flowing to the gob feeder zone,
        (4) said encapsulating glass being more readily ion-exchangeable than said base glass when treated with an ion-exchange medium containing alkali metal ions under the same ion-exchange condtions,
    (f) subjecting the shaped glass article to a sufficiently high elevated temperature and for a period of time sufficient to permit an ionic diffusion of said larger alkali metal ions of said base glass toward the encapsulating glass and an ionic diffusion of said smaller alkali metal ions of said encapsulating glass and towards the base glass, along the abutting glass surfaces to thereby form in the surface of said main body of said glass article a tensile stress and to thereby form in the surface of said encapsulating glass a compressive stress, said temperature being insufficient to relieve the compressive stress produced by the exchange of ions, and
    (g) cooling of said glass article.

2. The process as defined in claim 1 wherein the alkali metal oxide in said encapsulating glass is $Li_2O$.

3. The process as defined in claim 1 further comprising the step of contacting the outer surface layer of encapsulating glass on said article with an ion-exchange medium containing alkali metal ions having a larger ion size than the alkali metal ions in said surface layer at a temperature sufficient to cause ion exchange of the alkali metal ions in said medium for the smaller alkali metal ions in said surface layer and provide compressive stress in said encapsulating glass in addition to that afforded by the bonding of the two glass bodies of different expansion coefficients to form said integral glass body.

4. The process of claim 1 wherein the encapsulating glass has an oxide composition on a weight basis of about 43% to 63% $SiO_2$, 14% to 25% $Al_2O_3$, 0% to 30% CaO, 0% to 20% MgO, 3.5% to 20% $Na_2O$, 0% to 5% $K_2O$, 0% to 5% BaO, 0% to 5% $B_2O_3$, and CaO and MgO expressed as CaO being 8% to 30%, said $Na_2O$ and $K_2O$ expressed as $Na_2O$ being 5% to 20%, and 1% to 5% $Li_2O$, said $Na_2O$ being the predominant alkali metal oxide on a weight basis and said oxides other than $Li_2O$ constituting at least 90% of the glass.

5. The process as defined in claim 4 wherein said ion-exchange medium contains potassium salt in effective concentration.

6. The process of claim 1 wherein the heavier encapsulating glass constitutes at least about 1% and less than about 50% of the radial thickness of the encapsulated gob.

7. The process of claim 6 wherein the base glass contains on a weight basis substantially less than 10% $Al_2O_3$ and the encapsulating glass contains greater than 10% by weight of $Al_2O_3$.

8. The process of claim 5 wherein the ion-exchange medium is potassium nitrate.

9. The process of claim 4 wherein the ion-exchange medium is sodium nitrate.

10. The process of claim 1 wherein said base glass and said heavier encapsulating glass are thermally crystallizable glasses and the process further includes during said treatment an in situ crystallization of both glasses.

11. The process of claim 10 wherein said ion-exchange treatment is subsequent to said crystallization.

References Cited

UNITED STATES PATENTS

| | | | |
|---|---|---|---|
| 3,113,877 | 12/1963 | Janakirama-Rao | 65—33 X |
| 3,573,073 | 3/1971 | Duke et al. | 65—30 X |
| 3,582,297 | 6/1971 | Lakeman | 65—30 X |
| 2,779,136 | 1/1957 | Hood et al. | 65—60 X |
| 3,287,200 | 11/1966 | Hess et al. | 65—30 |
| 3,485,702 | 12/1969 | Mochel | 65—30 X |
| 3,533,888 | 10/1970 | Eppler et al. | 65—30 X |
| 3,589,878 | 6/1971 | Achener | 65—30 X |
| 3,574,582 | 4/1971 | Siegmund et al. | 65—30 X |
| 3,586,521 | 6/1971 | Duke | 65—30 X |
| 2,998,675 | 9/1961 | Olcott | 65—60 X |

FRANK W. MIGA, Primary Examiner

U.S. Cl. X.R.

65—3, 60, 33

UNITED STATES PATENT OFFICE
CERTIFICATE OF CORRECTION

Patent No. 3,728,095            Dated  April 17, 1973

Inventor(s) Everett F. Grubb, Friedrich W. Hammer & Joseph R. Monks

It is certified that error appears in the above-identified patent and that said Letters Patent are hereby corrected as shown below:

In column 15, line 34, after "assignee" delete "now U.S. Pat. 3,522,828, issued Aug. 4, 1970." and insert --now U.S. Pat. 3,528,828, issued Sept. 15, 1970."

In column 20, lines 27 and 28, after "Ser. No. 371,089" delete "now U.S. Pat. 3,522,828, issued Aug. 4, 1970" and insert --now U.S. Pat. 3,528,828, issued Sept. 15, 1970".

In column 20, lines 39 and 40, after "Ser. No. 371,089" delete "now U.S. Pat. 3,428,513, issued Feb. 18, 1969" and insert --now U.S. Pat. 3,528,828, issued Sept. 15, 1970".

Signed and sealed this 16th day of July 1974.

(SEAL)
Attest:

McCOY M. GIBSON, JR.
Attesting Officer

C. MARSHALL DANN
Commissioner of Patents